Oct. 15, 1929.  G. NAISMITH ET AL  1,732,137
FURNACE
Filed Dec. 12, 1927  2 Sheets-Sheet 1
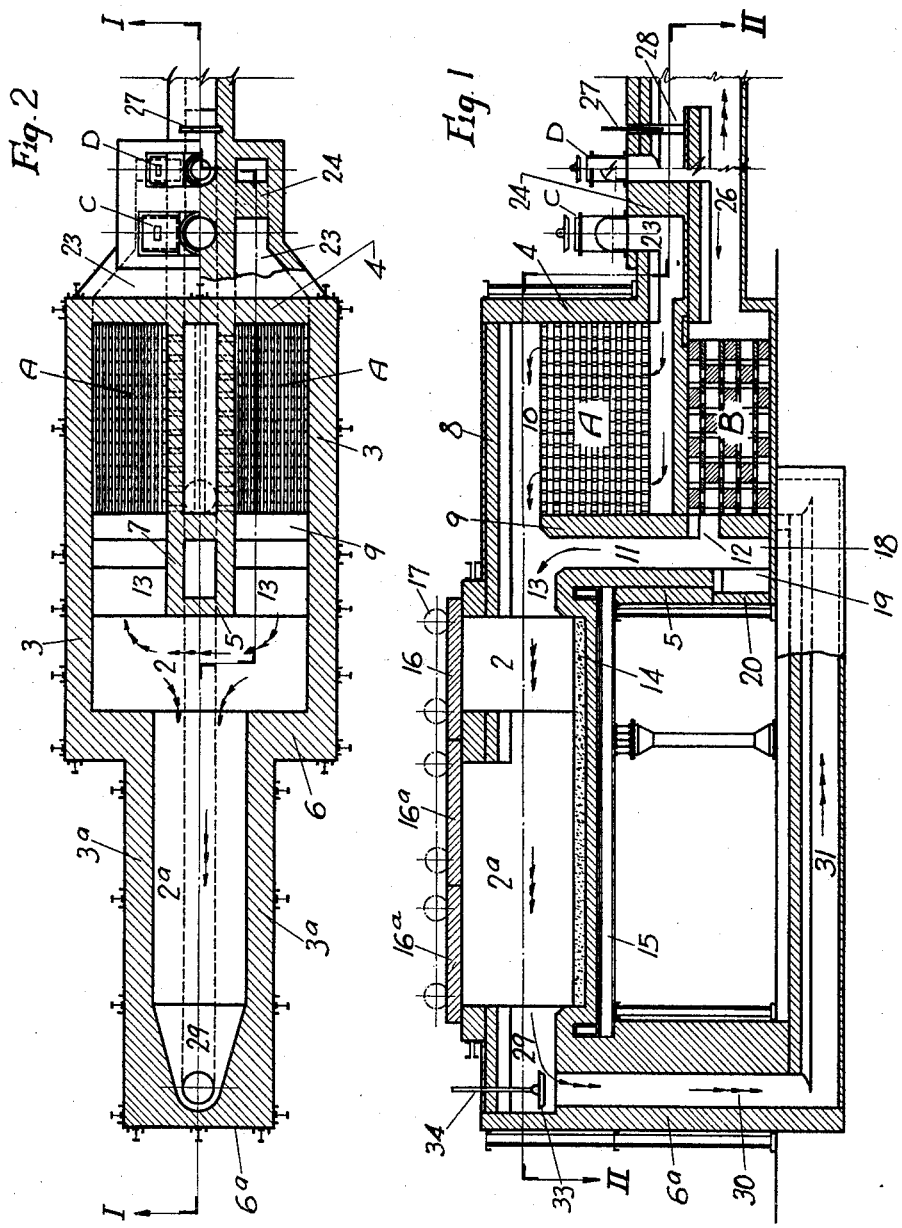

Oct. 15, 1929.    G. NAISMITH ET AL    1,732,137
FURNACE
Filed Dec. 12, 1927    2 Sheets-Sheet 2
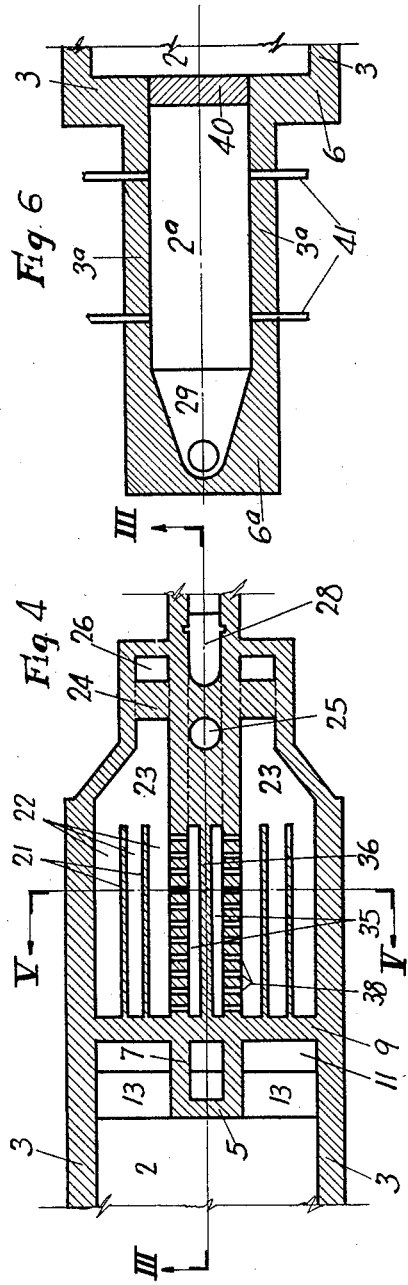
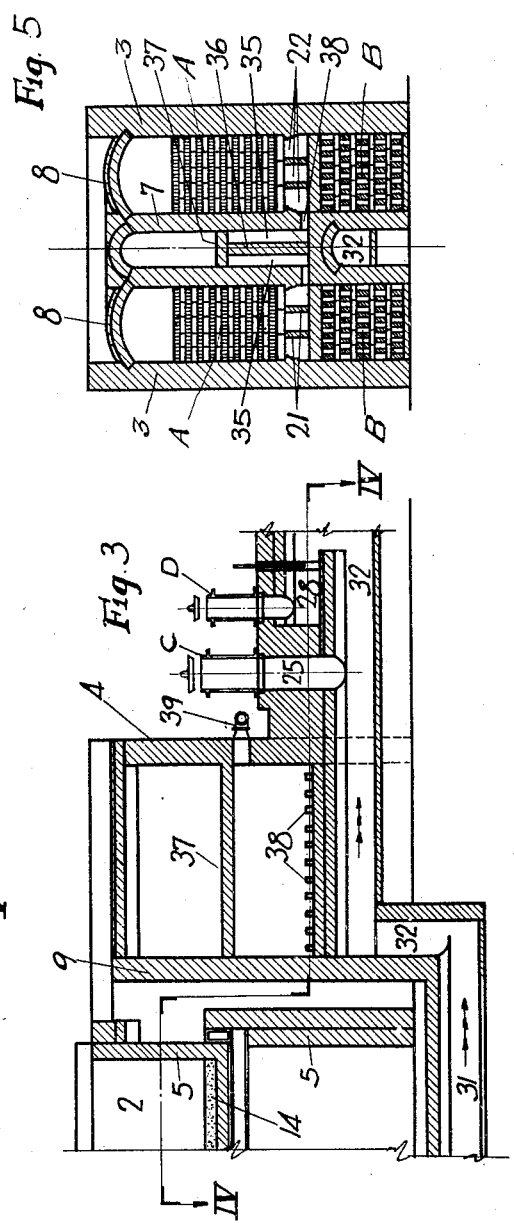
Inventors
George Naismith
Donald M. Naismith
By C. M. Clarke
Attorney Patented Oct. 15, 1929

1,732,137

UNITED STATES PATENT OFFICE

GEORGE NAISMITH AND DONALD M. NAISMITH, OF PITTSBURGH, PENNSYLVANIA

FURNACE

Application filed December 12, 1927. Serial No. 239,322.

Our invention is an improvement in heating furnaces of the regenerative type particularly adapted to the heating of ingots and the like. The furnace embodies a main heating chamber and a supplemental preheating or preliminary heating chamber, adapted to be maintained in open communication with the main heating chamber with partial circulation of combustion gases therethrough, or divided from the main heating chamber and having a supplemental fuel supply.

The invention has in view to provide a regenerative furnace construction in which the fuel gases pass through pre-heating checkerwork arranged below air pre-heating checkerwork with circulation through the main heating chamber of the furnace, and return of the gases of combustion through correspondingly arranged checkerwork at the other side of a partition wall with circulating ports, reversing valves, etc., as shall be more fully hereinafter described.

Also, to provide for partial circulation of a portion of the main gases of combustion through the pre-heating furnace chamber with return of the waste gases to the stack without circulation through the checkerwork and independent thereof, but utilizing refracted heat therefrom, or withdrawal of the products of combustion from such independent fuel supply in the same manner.

The main heating chamber or soaking pit, when in communication with the pre-heating furnace chamber, or cut off therefrom, receives the incoming pre-heated fuel gas and air in combustion at one side of the main chamber and discharges a part or all of the waste gases at the other side of the main furnace chamber, through which the gases circulate in an approximately horizontal path, alternating with each reversal of the valves, whereby the ingots, etc., are exposed to the heating action at all times.

The invention also utilizes a supplemental air supply for furnishing additional air to the air pre-heating checkerwork for supplementing the heated air supply, under certain conditions of operation.

In the drawings showing preferred embodiments of the invention:

Fig. 1 is a longitudinal vertical section through the furnace on the line I—I of Fig. 2;

Fig. 2 is a horizontal section, partly in plan, on the section line II—II of Fig. 1, showing the air pre-heating checkerwork in plan;

Fig. 3 is a longitudinal sectional view on the line III—III of Fig. 4, showing the independent waste gas return circulation from the pre-heating furnace, to the stack;

Fig. 4 is a horizontal sectional view on the line IV—IV of Fig. 3;

Fig. 5 is a vertical cross sectional view on the line V—V of Fig. 4;

Fig. 6 is a partial horizontal sectional view similar to the heating furnace construction of Fig. 2, but showing the pre-heating furnace closed off from the main heating furnace and provided with an independent fuel supply.

The main soaking pit or heating chamber 2 of the furnace is of generally rectangular construction within side walls 3, 3, an outer end wall 4 and inner transverse partition 5.

The latter forms a partial closure of the heating chamber 2, forming the inner end portion of the regenerative part of the furnace, which is also enclosed between the main side walls 3 and the opposite end wall 4. In the principal construction an end wall 6 is not continuous across the end of main heating chamber 2, but is provided with a middle opening leading into the supplemental or preheating chamber 2ª enclosed within the supplemental side walls 3ª and an endmost closing wall 6ª.

A central double-sided partition wall or pier 7 extends vertically from the base of the construction upwardly to the roof forming a support for the arched coverings 8—8 of the upper side-by-side air regenerative chambers A and longitudinally from partition 5 to end wall 4. Chamber A is arranged vertically above gas regenerative chamber B, both chambers being preferably of equal width and in duplicate arrangement at opposite sides of the hollow pier 7 between the main end wall 4 and an opposite inner wall 9.

Wall 9 extends from the base upwardly to the top of the checkerwork in chamber A, leaving an intervening horizontal space 10 for circulation of gases either from or to the checkerwork below the roof arches 8.

Between walls 9 and 5 and at each side of hollow pier 7 is a vertical port 11 communicating with the upper portion of chamber B by port 12, and upwardly extending port 11 carries heated gas for mixture with heated air in the common mixing, combustion and delivery channel 13.

Each of such channels is of substantially the same width as that of the checkerwork chambers A and B and leads into the main furnace chamber 2 at one side with a corresponding return channel 13 at the opposite side, as in Fig. 2. Obviously, the circulation is reversed upon reversal of the valves, according to the well known principle of operation of regenerative furnaces of the Siemens valve type.

As indicated, Figs. 1 and 2, a portion of the gases of combustion pass outwardly through pre-heating chamber $2^a$, the construction of which and means for conducting the waste gases to the stack will be hereafter described.

As shown, the opposite inner surfaces of main side walls 3 are continuous, avoiding any abutment or shoulder projections, and facilitating circulation of the gases to and from the main furnace chamber and with circulation therein around and between the ingots. The furnace chamber 2 is provided with a suitable receiving and supporting floor 14, carried outwardly beyond the main wall 5 throughout the extent of both the main and supplemental chambers, beyond main wall 5, on a structural supporting platform 15, with suitable reinforcing buckstaves etc., as is usual in such construction.

A removable cover 16 provided with supporting wheels 17 is adapted to be moved along a supporting trackway for opening and closing the main furnace chamber 2, similar covers $16^a$ being provided for the supplemental pre-heating chamber $2^a$, for opening and closing one or both of said chambers, as in Fig. 1.

Any slag or other accumulation in the bottom portion 18 of port 11 may be removed through an opening 19 at the base of wall 5, having a suitable cover or door 20.

The checkerwork in chamber A extends upwardly above supporting walls 21 with intervening circulation passages 22 communicating with the port 23 at each side of the middle hollow pier or wall portion of the valve supporting structure 24 and with the reversing air circulation controlling valve C. By this arrangement, the incoming air circulates vertically upward through the checkerwork A throughout its full extent.

The operation of said valve C will be readily understood by those familiar with the art, supplying air alternately to one or the other of the air regenerative chambers A and with return of the waste gases from the other chamber to the outlet opening 25, leading to the stack.

The checkerwork in chamber B is suitably arranged, providing a comparatively deep body of closely assembled alternating series of vertically arranged tiles or bricks for very complete and thorough contact therewith of the incoming gas for heating.

The gas supply entering the furnace through valve D passes from the valve through a conduit or port 26 inwardly to the chamber B which is filled throughout its vertical height, with the checkers laid vertically and horizontally, through which the gas passes in its progress toward the furnace in a continuously horizontal direction. The reverse circulation of waste gases passes from opposite conduit 13 downwardly through flue 11 and horizontally outward through the checkerwork B and outwardly to the stack, as will be readily understood.

A damper valve 27 is preferably located across extension port 28, leading to the stack, for control of the circulation thereto. By raising or lowering the damper valve the effect of the stack draft on the outgoing flue gases in the gas pre-heating checkerwork in chamber B may be accurately regulated and controlled, in operating the furnace.

The supplemental or pre-heating chamber $2^a$ is provided at its outer end with a port or flue extension 29 extending through the upper portion of end wall or column $6^a$.

A downwardly extending flue 30 connects with a horizontal flue 31, under the middle portion of the foundation and having an upwardly and outwardly leading flue extension or conduit 32, communicating with the stack and with the main products of combustion from conduits 25 and 28 from valves C and D.

Flue 30 is provided at its upper end with an opening and closing valve 33 having an operating rod 34, by which circulation of gases through the supplemental chamber $2^a$ may be regulated.

For the purpose of adding supplemental air to the upper chambers A, the middle wall or pier 7 is hollow as shown, and provided with longitudinal air cavities 35 separated by a middle longitudinal partition 36 and closed at the top by covers 37. Each of said chambers 35 communicates at the bottom by ports 38 and inner longitudinal openings 22 with the main checkerwork chamber. Air supply connections 39 leading from any suitable source and provided with proper regulating valves are arranged to introduce supplemental air to the cavities 35, so as to amplify the air supply when desired, with pre-heating, and combination with the main mixture in the circulation.

By such means the operation of the furnace can be speeded up under certain conditions and as desired, within the control of the operator.

When desired the supplemental pre-heating chamber 2ª may be blocked off from the main chamber 2 by a transverse partition 40, as shown in Fig. 6. In such case the supplemental chamber is provided with independent fuel and air supply, as gas or oil, by series of pipes 41 leading inwardly through the opposite side walls 3ª, as in Fig. 6. Otherwise, the construction and operation is the same as above described.

In either case, whether the main and supplemental furnace chambers are in communication, or independent, the ingots etc. to be heated may be first placed in the pre-heating chamber 2ª and after pre-heating by either of the methods described are then lifted out and placed in the main chamber 2, with manipulation of the covers 16 and 16ª, where they are subjected to the full heating action of the furnace.

The main and supplemental chambers 2 and 2ª may however, be used together as one continuous heating chamber, under continued operation of the furnace with proper control, without necessary pre-heating.

What we claim is:

1. A regenerative heating furnace provided with a middle hollow ported wall, continuous side walls enclosing inner regenerative chambers and a main heating chamber forming an extension thereof beyond the middle wall, said chamber having a pre-heating extension, and means providing a circulation of heating gases from the regenerative chambers through the main heating chamber across the end of the middle wall and return therefrom to companion regenerative chambers with passage of a portion of the gases through the pre-heating chamber.

2. A regenerative heating furnace provided with a middle hollow ported wall, continuous side walls enclosing inner regenerative chambers and a main heating chamber forming an extension thereof beyond the middle wall between the opposite side walls, alternately operative pre-heating regenerative chambers for gas and air between said walls communicating directly between the side walls with the heating chamber for circulation therethrough, a supplemental pre-heating chamber forming an extension of the main heating chamber, and an outgoing flue for products of combustion communicating with the other end of the pre-heating chamber.

3. A regenerative heating furnace provided with continuous side walls enclosing inner regenerative chambers and a main heating chamber forming an extension thereof between its opposite side walls forming extensions of said walls, alternately operative pre-heating regenerative chambers between said walls and a middle wall, said regenerative chambers opening into the inner end of the heating chamber for supply at one side and exhaust at the other, each of said regenerative chambers having an upper air regenerative portion and a lower gas regenerative portion, and a pre-heating furnace forming a reduced extension of the main heating furnace provided at its opposite end with a take-off flue for products of combustion.

4. A regenerative heating furnace provided with continuous side walls enclosing inner regenerative chambers and a main heating chamber forming an extension thereof between its opposite side walls forming extensions of said walls, alternately operative pre-heating regenerative chambers between said walls and a middle wall, said regenerative chambers opening into the inner end of the heating chamber for supply at one side and exhaust at the other, each of said regenerative chambers having an upper air regenerative portion and a lower gas regenerative portion, means for supplying air through the middle wall to the air pre-heating chamber, and a pre-heating furnace forming a reduced extension of the main heating furnace provided at its opposite end with a take-off flue for products of combustion.

5. A regenerative heating furnace provided with continuous side walls enclosing inner regenerative chambers and a main heating chamber forming an extension thereof between its opposite side walls forming extensions of said walls, alternately operative pre-heating regenerative chambers between said walls and a middle wall, said regenerative chambers opening into the inner end of the heating chamber for supply at one side and exhaust at the other, each of said regenerative chambers having an upper air regenerative portion and a lower gas regenerative portion, a pre-heating furnace forming a reduced extension of the main heating furnace provided at its opposite end with a take-off flue for products of combustion, and valve controlled conduits for supplying gas and air to the lower and upper regenerative chambers at one side of the middle wall and for withdrawing products of combustion from the other side of said wall for circulation to a take-off flue or stack.

6. In a furnace of the class described, a main heating chamber extending across between opposite continuous straight side walls having a middle reduced pre-heating extension, regenerative gas and air chambers at each side between the continuous straight walls opening into the main heating chamber, a hollow middle wall having circulating ports communicating with the regenerative chambers and terminating at the main heating chamber, means providing alternating supply and return circulation through said regenerative gas and air chambers having connection with a stack flue, and a return flue connected with the outer end of the preheating chamber and with the stack flue.

In testimony whereof we hereunto affix our signatures.

GEORGE NAISMITH.
DONALD M. NAISMITH.